United States Patent [19]
Ford

[11] 4,268,110
[45] May 19, 1981

[54] FACET ANGLE CORRECTOR FOR MULTI-FACETED OPTICAL SCANNER

[75] Inventor: Peter W. Ford, Winchester, Mass.

[73] Assignee: Itek Corporation, Lexington, Mass.

[21] Appl. No.: 84,275

[22] Filed: Oct. 12, 1979

[51] Int. Cl.³ .............................................. G02B 27/17
[52] U.S. Cl. ...................................... 350/6.7; 350/6.4
[58] Field of Search .................. 350/6.8, 6.7, 6.4, 6.3, 350/6.2, 6.5; 358/205, 206, 293; 250/236; 352/106-113, 116, 119, 120

[56] References Cited

U.S. PATENT DOCUMENTS

| | | | |
|---|---|---|---|
| 3,657,792 | 4/1972 | Hug et al. | 350/6.7 |
| 3,897,132 | 7/1975 | Meeussen et al. | 350/6.7 |
| 4,002,830 | 1/1977 | Brown et al. | 350/6.8 |
| 4,129,355 | 12/1978 | Noguchi | 350/6.7 |
| 4,163,600 | 8/1979 | Russell | 350/6.3 |

FOREIGN PATENT DOCUMENTS 451297  8/1936  United Kingdom ................ 358/206

*Primary Examiner*—Jon W. Henry
*Attorney, Agent, or Firm*—Homer O. Blair; Robert L. Nathans; Gerald H. Glanzman

[57] ABSTRACT

Multi-faceted rotating optical scanning system having facet angle corrector means for reducing banding in imagery produced therewith. In accordance with the invention, the corrector means comprises a corrector plate supporting a plurality of transparent discs, each one of said discs being positioned in advance of a different facet of said scanner. Each of the discs is further designed to have a slight wedge angle between its two surfaces such that by independently rotating each disc, a light beam passing through it can be bent by a precise amount to control the angle at which the beam impinges upon the associated facet, and, hence, the angle at which it is reflected therefrom onto an image receiving medium. This system thus permits any banding that might otherwise be caused by relative differences in the angular orientation of each facet to be essentially eliminated in a highly accurate, inexpensive manner.

10 Claims, 2 Drawing Figures

FACET ANGLE CORRECTOR FOR MULTI-FACETED OPTICAL SCANNER

TECHNICAL FIELD

The present invention is directed to an improvement in multi-faceted rotating optical scanning systems, and, more particularly, to a multi-faceted scanner having novel facet angle corrector means for reducing banding in imagery produced therewith.

BACKGROUND ART

"Banding" is the term used to refer to the effect obtained in raster scanning systems when the spacing between each raster line in the image recorded thereby is not equal. In those scanning systems which employ multi-faceted scanners, a primary cause of banding is due to differences between the angles of each facet of the scanner relative to the axis of rotation of the scanner.

It has been demonstrated that scanners having angle tolerances of ±2 arc seconds between facet angles can be constructed relatively easily and inexpensively, but the construction of a scanner having facets positioned to a significantly greater accuracy can be achieved, if at all, only at great expense.

There are many applications, however, in which a reduction in banding, and, hence, more accurate facet alignment is necessary or, at least, would be very desirable. For example, it would be desirable to be able to provide a relatively inexpensive, easy to construct scanner in which the difference between facet angles is no more than about ±0.5 arc seconds.

The problem of banding has, of course, been recognized previously, and there are a variety of techniques suggested in the prior art to reduce or eliminate it. U.S. Pat. No. 3,657,792, for example, describes a system and procedure by which each facet in a multi-faceted scanning mirror can be individually adjusted. This technique, and, in fact, other correction schemes involving the direct adjustment of mirror elements are not very good because only minute changes in mirror position will cause relatively significant changes in the position of the output light beam making accurate adjustment very difficult and time consuming.

Other suggested correction techniques involve the use of active systems such as acousto-optic beam deflectors, and, while such an approach appears to be feasible, it is relatively complex and expensive due to the need for electronics and other costly components.

U.S. Pat. No. 4,129,355 describes another system using a pair of self-balancing multi-faceted scanning mirrors to apparently eliminate parallelism errors by subtractive cancellation, and in column 1 of this particular patent yet additional approaches are discussed.

In general, the various techniques suggested in the prior art are lacking in that they appear to be expensive, complex or of doubtful accuracy.

DISCLOSURE OF THE INVENTION

By the present invention, a facet angle corrector for multi-faceted scanner systems is provided which is extremely effective in reducing banding to substantially imperceptible levels, and, at the same time, is inexpensive to construct and easy to operate.

In accordance with the present invention, the facet angle corrector comprises a novel corrector plate designed to support a plurality of transparent beam deflecting means, and in accordance with the presently most preferred embodiment, these beam deflecting means comprises a plurality of transparent discs with each one of the discs being positioned in front of and associated with a different facet of the scanner.

Each of the discs is further manufactured to have a slight wedge angle between its two surfaces such that by rotation of a particular disc, the light beam passing through it can be caused to bend through a precisely controllable angle prior to its impinging upon its associated scanner facet. By controlling the angle at which the light beam impinges upon a facet, the angle at which the light is reflected from the facet can also be controlled, and, hence, the position at which it impinges upon the ultimate recording medium can also be very accurately adjusted and controlled. By individually rotating each of the discs to independently adjust each facet of the scanner, banding can thus be essentially eliminated, or, at least reduced to imperceptible levels.

The use of transparent wedge shaped members to control the bending of the light beam avoids many of the problems encountered in the prior art systems described above. Initially, since the discs are able to adjust the system simply be being rotated, they don't have to be manufactured to any great accuracy. This means they can be made relatively inexpensively. Also, a relatively large amount of rotation of a particular disc will only slightly alter the position of the beam passing through it making it easy to adjust the system very accurately. With mirrors, a slight movement of the mirror will significantly change the position of the beam making accurate adjustment much more difficult. In general, with the present invention, an inexpensive, yet very accurate system is provided which can essentially eliminate banding in multi-faceted scanner systems. The system provided is easy to operate and can readily be incorporated into existing scanning systems without any significant redesign being necessary. Yet further details and specific features of the invention will be set out hereinafter in conjunction with the description of the best mode for carrying out the invention.

BEST MODE FOR CARRYING OUT THE INVENTION

Figure 1:
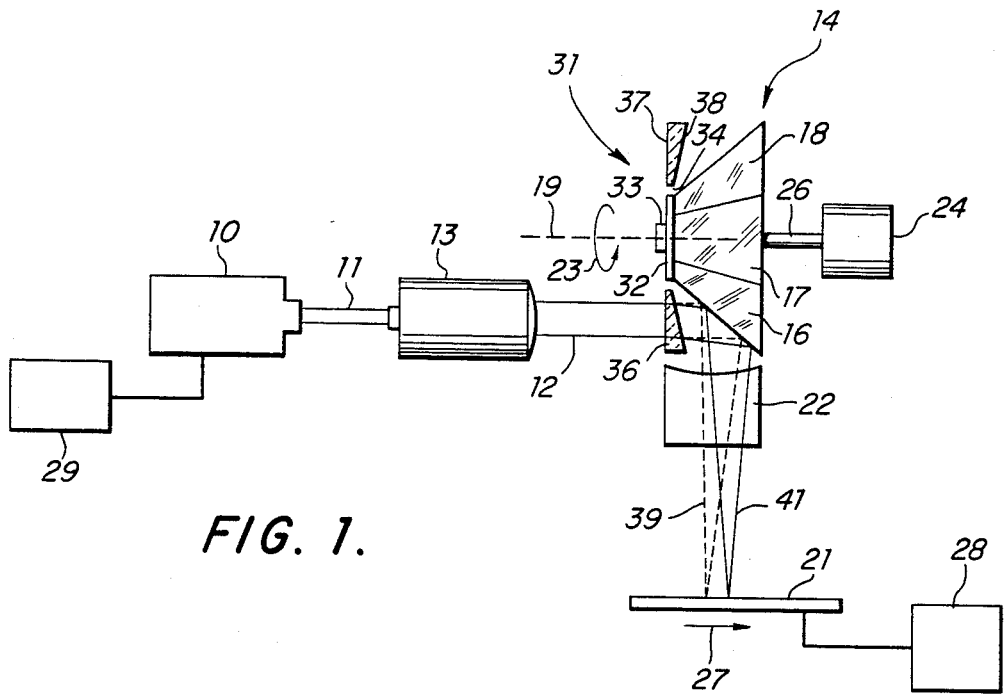
FIG. 1 schematically illustrates a scanning optical system employing a multi-faceted scanner and incorporating a facet angle corrector means according to a presently most preferred embodiment of the invention.

FIG. 1 schematically illustrates a scanning system incorporating a facet angle corrector according to a presently most preferred embodiment of the invention. As shown, the system includes a suitable light source, such as laser source 10, for generating a light beam 11 which, after preferably being expanded into beam 12 by conventional beam expanding optics 13, impinges upon multi-faceted pyramidal scanner 14 positioned in its path.

Scanner 14 is of conventional type and contains a plurality of mirror faces or facets 16, 17, 18, etc. arranged into a pyramidal shape symmetric about a scanner spin axis 19. The scanner is oriented so that the light beam 12 will, upon being reflected off of any one of the facets, be imaged onto an appropriate light sensitive imaging medium 21 via an imaging lens 22. Specifically, and as is well known to those in the art, scanner 14 is adapted to be rapidly rotated about its axis (as indicated by arrow 23) by a suitable motor 24 coupled thereto as schematically illustrated by connecting rod 26, and, as it is rotated, the mirror facets will sequentially move across the beam 12, and each facet will scan the beam across the medium 21 to form one complete scan line.

By indexing the system between each scan line, for example, by moving medium 21 in the direction indicated by arrow 27 a distance equal to the desired spacing between lines, facets 16, 17, 18, etc. will (ideally) scan consecutive equally spaced lines across the medium 21. The indexing structure may take any one of many forms that are known in the art and is illustrated by box 28 simply for purposes of completeness.

In those applications wherein the scanning system is being used to record information, the light beam will be modulated by appropriate electronics 29 as it is being scanned. Inasmuch as this structure is not relevant to a clear understanding of the present invention, it is not discussed in any detail, but, again, is simply mentioned for purposes of completeness.

As pointed out above, after each line is scanned across medium 21, the system is indexed by a precise distance so that the next facet on the scanner will scan the next line on the medium, and so forth. If the scanner has ten facets, therefore, ten lines will be scanned on the medium during one complete revolution of the scanner, and, ideally, these lines will all be equally spaced. For the spacing to actually be equal, however, it is necessary that each of the facets on the scanner be mounted at precisely the same angle relative to the spin axis 19 of the scanner so that each facet will reflect the light beam impinging upon it along precisely the same path onto the medium 21. If the angles of one or more of the facets relative to the spin axis 19 are not equal, and, in fact, if they differ only slightly, the line spacing will not be equal and the "banding" effect will result.

As discussed previously, to build a multi-faceted scanner whose facets are positioned at exactly the same angle relative to the spin axis of the scanner would be very difficult and expensive if it could be done at all. To build a scanner that is relatively accurate, however, for example, one in which the facet angles are accurate to a tolerance of ±2 arc seconds can be done fairly easily and inexpensively. The present invention, therefore, has been developed to take such an easy to construct scanner and utilize it in a system together with additional structure to essentially eliminate banding.

With reference again to FIG. 1, the optical system illustrated has been modified from coventional scanning systems by introducing a corrector means 31 in the optical path in advance of the scanner 14. The function of the corrector means is, in effect, to individually correct the angle of each mirror facet in the spinner in such a way as to essentially eliminate any banding errors in the imagery produced thereby.

In the preferred embodiment illustrated, the corrector means comprises a corrector plate 32 (shown more clearly in FIG. 2) mounted to the end of scanner 14, as by means of a locking bolt 33 passing through a central opening in the plate. Plate 32 is manufactured to have a plurality of circular openings 34 arranged around its periphery within which a plurality of transparent discs 36 are supported. The number of discs equals the number of facets in the scanner, and each disc is aligned with a particular facet.

Each disc 36 in the plate 32 is designed to have a slight wedge angle between its two surfaces (e.g., surfaces 37 and 38 in FIG. 1). Such a disc will cause a parallel beam of light passing through it to be angularly bent or deflected, and, by rotating the disc, the amount of deflection can be very precisely controlled. Thus, by independently rotating each disc in the corrector plate, the angle at which the light beam impinges upon and, hence, the angle at which it reflects off of each facet onto medium 21 can be very precisely adjusted and controlled.

The adjustment capability is illustrated in FIG. 1 where it is shown how rotation of a disc can shift the light beam from the dotted line position 39 to the solid line position 41 to thus correct for any error in the angle of a particular facet relative to axis 19.

Figure 2:
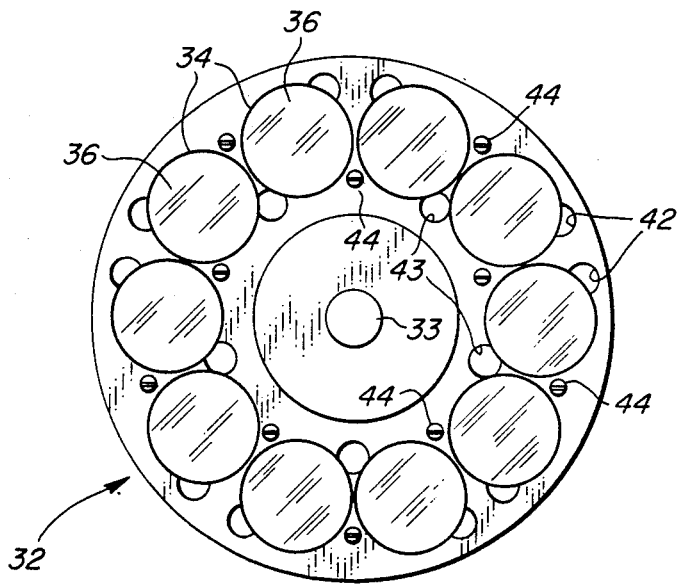
FIG. 2 schematically illustrates some of the details of the corrector means shown in FIG. 1.

Individual adjustment of the discs can be accomplished by any one of a variety of techniques. In FIG. 2, a pair of diametrically opposed cutouts 42 and 43 are formed adjacent each disc supporting opening 34 in the plate so that a portion of the edge of each disc 36 is uncovered. A pair of padded tweezers (or even the fingers) can then be used to grasp the edge of the discs and rotate them by precise amounts.

Once the position of each disc has been set in this way, it can be locked in place by means of angled locking screws 44, which upon being screwed into the plate 32 will press against the edge of the discs and hold them in place in a reliable manner. Obviously, other structures for supporting, adjusting and locking the discs could also be employed.

Adjustment of the discs is essentially made by a trial and error technique. The discs would initially be set so that their gradient is parallel to the scanner tangent, i.e., no correction. The system is then run and the banding pattern on the recording material is observed. Then any one disc is rotated by, for example, 20° and the system run again. The change in the banding pattern will then identify the various line position errors with their respective facets as well as giving a quantitative value for the necessary corrections which must be carried out. Each of the discs in the plate is then adjusted as necessary to eliminate banding. Once corrected, the discs can be locked permanently in position by screws 44.

In a system such as described herein wherein the scanner is originally constructed so that the angular orientation of the facets relative to one another are accurate to a tolerance of ±2 arc seconds, the corrector means can easily correct the facet angles to an accuracy of ±0.5 arc seconds or better which will permit any banding errors to essentially be eliminated.

In a preferred embodiment, the discs may be constructed to have a wedge angle of, perhaps, 8 arc seconds. By rotating such a disc, the amount of correction swings from a plus half wedge angle to a minus half wedge angle in 180° of rotation yielding a range of ±4 arc seconds of correction for each disc. Obviously, other amounts of correction can be attained using discs with different wedge angles.

In addition to errors in the angular orientation of the facets, banding can also be caused by bearing errors in the scanner which can cause the axis of rotation to wobble in a conical motion. If this is regular, i.e., caused by a lack of race concentricity, it can also be corrected by means of the corrector plate of the present invention. Banding errors due to errors in ball bearing diameter or to vibration, however, cannot be corrected by this invention.

The transparent discs 36 are preferably constructed of a low dispersion, low refractive index glass. The use of low dispersion glass is preferred so that colors won't be separated out by the disc in those applications wherein colored light is employed. The use of a low index of refraction glass is also preferred because it permits the discs to be made thicker and more cheaply.

Although, in the embodiment illustrated, a ten facet scanner is employed, obviously scanners having greater or fewer facets may be utilized as well.

Also, the invention may be practiced using polygonal scanners as well as pyramidal scanners as has been described.

It should also be understood that the transparent discs could consist of optical lenses. Such an element would exhibit an optical power in addition to being able to bend the light beam, and this could be useful in some applications.

Because the invention could take many forms other than the preferred embodiment described herein, it should be clearly understood that the invention should be limited only insofar as required by the scope of the following claims.

I claim:

1. In a light scanning apparatus including:
   a. means for providing a light beam;
   b. beam deflector means positioned in the path of said light beam, said beam deflector means including a plurality of beam deflecting faces; and
   c. drive means for moving said beam deflector means to sequentially move said plurality of beam deflecting faces across said light beam to effect the scanning thereof; the improvement comprising
   d. corrector means for correcting said light scanning apparatus for misalignment of said plurality of beam deflecting faces, said corrector means including a plurality of transparent optical elements in the path of said light beam, each of said plurality of transparent optical elements being associated with a different one of said plurality of beam deflecting faces and comprising an optical wedge means for bending said light beam through a given angle prior to the light beam impinging upon the associated beam deflecting face to compensate for said misalignment of said associated beam deflecting face, and wherein said corrector means further includes means for individually adjusting each of said optical wedge means for controlling the angle at which said light beam passing therethrough is bent.

2. Apparatus as recited in claim 1 wherein each of said optical wedge means comprises a transparent disc having first and second opposed surfaces with a wedge angle therebetween, and wherein said means for individually adjusting each of said optical wedge means includes means for mounting each of said discs to permit independent rotation of each of said discs.

3. Apparatus as recited in claim 1 wherein said beam deflector means comprises a multi-faceted scanner having a plurality of beam deflecting faces and wherein said apparatus further includes means for rotating said scanner to sequentially move said plurality of said beam deflecting faces across said light beam to effect the scanning thereof.

4. Apparatus as recited in claim 3 wherein said corrector means comprises a corrector plate supported in advance of said scanner means, said corrector plate including means for supporting said plurality of optical elements, and wherein said apparatus further includes means for rotating said corrector plate in synchronism with said optical scanner means.

5. Apparatus as recited in claim 4 including means for coupling said corrector plate to said scanner means for rotation therewith.

6. Apparatus as recited in claim 5 wherein said plurality of optical elements comprise a plurality of transparent discs, each of said plurality of discs having first and second opposed surfaces defining a wedge angle therebetween.

7. Apparatus as recited in claim 6 wherein said optical scanner menas comprises a pyramidal scanner.

8. In a light scanning apparatus including:
   a. means for providing a light beam;
   b. mulit-faceted scanning apparatus positioned in the path of said light beam, said multi-faceted scanning apparatus having a plurality of beam deflecting faces thereon; and
   c. drive means for rotating said scanning apparatus for sequentially moving said plurality of faces across said light beam to effect the sequential scanning of a plurality of scan lines across a light sensitive medium; the improvement comprising
   d. corrector means in the path of said light beam and in advance of said scanning apparatus for correcting said scanning apparatus for misalignment in the orientation of said plurality of faces with respect to said light beam, said corrector means including a plurality of transparent optical elements associated with said plurality of faces, each of said transparent optical elements being of generally wedge shape for bending said light beam by amounts sufficient to correct each of said plurality of faces for any misalignment in the orientation thereof, and wherein each of said plurality of transparent optical elements is associated with a different one of said plurality of beam deflecting faces, and wherein said corrector means further comprises a corrector plate for supporting said plurality of transparent optical elements, said corrector plate being coupled to said scanning apparatus for rotation therewith.

9. Apparatus as recited in claim 8 and including means for independently rotating said plurality of transparent optical elements to independently correct each of said plurality of faces for any misalignment in the orientation thereof.

10. Apparatus as recited in claim 9 wherein said multi-faced scanning apparatus comprises a pyramidal scanner.

* * * * *